US008504288B2

(12) United States Patent
Kadous et al.

(10) Patent No.: US 8,504,288 B2
(45) Date of Patent: Aug. 6, 2013

(54) QUALITY CONTROL OF MAPPING DATA

(75) Inventors: Mohammed Waleed Kadous, Sunnyvale, CA (US); Andrew Lookingbill, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 274 days.

(21) Appl. No.: 13/105,361

(22) Filed: May 11, 2011

(65) Prior Publication Data

US 2012/0290636 A1 Nov. 15, 2012

(51) Int. Cl.
*G01C 21/12* (2006.01)
*H04M 11/04* (2006.01)
*H04W 24/00* (2009.01)

(52) U.S. Cl.
USPC ........ 701/433; 701/434; 701/450; 455/404.2; 455/456.1

(58) Field of Classification Search
USPC ...... 709/205; 701/433, 434, 450; 455/404.2, 455/456.1, 477
See application file for complete search history.

(56) References Cited

U.S. PATENT DOCUMENTS

| | | | |
|---|---|---|---|
| 6,009,359 A | 12/1999 | El-Hakim et al. | |
| 7,069,124 B1 | 6/2006 | Whittaker et al. | |
| 7,312,752 B2 | 12/2007 | Smith et al. | |
| 7,417,544 B2 | 8/2008 | Artem et al. | |
| 7,443,298 B2 | 10/2008 | Cole et al. | |
| 7,460,940 B2 | 12/2008 | Larsson et al. | |
| 7,471,243 B2 | 12/2008 | Roslak | |
| 7,532,113 B2 | 5/2009 | Horvitz et al. | |
| 7,598,865 B2 | 10/2009 | Zhang et al. | |
| 7,620,493 B2 | 11/2009 | Stankiewicz et al. | |
| 7,679,561 B2 | 3/2010 | Elwell, Jr. et al. | |
| 7,791,538 B2 | 9/2010 | Yanagihara | |
| 7,898,977 B2 | 3/2011 | Roese et al. | |

(Continued)

FOREIGN PATENT DOCUMENTS

| | | |
|---|---|---|
| EP | 2099240 A1 | 9/2009 |
| WO | 2009021068 A1 | 2/2009 |

(Continued)

OTHER PUBLICATIONS

Chunwang Gao, Zhen Yu, Yawen Wei, Steve Russell, and Yong Guan, "A Statistical Indoor Localization Method for Supporting Location-based Access Control", Apr. 2009, Mobile Networks and Applications, vol. 14, Issue 2, pp. 253-263.*

(Continued)

*Primary Examiner* — Aaron Strange
(74) *Attorney, Agent, or Firm* — Lerner, David, Littenberg, Krumholz & Mentlik, LLP

(57) ABSTRACT

Aspects of the disclosure relate to quality control of survey data used to generate and or supplement map information. A device may be walked through an indoor space in order to collect survey data (accelerometer, gyroscope, wireless network identifiers, etc.). The survey data is then transmitted to a server for further processing to identify the path (or the various locations) of the device in the indoor space. The path may be determined by referring to a map of the indoor location and a localization algorithm, for example, a particle filter or least squares optimizer. The path may be compared to other survey data and paths from the same indoor space as well as the map in order to provide an estimate of the quality of the localization produced for the survey data. Low quality survey data may be flagged for further review or used to make changes to the map.

20 Claims, 13 Drawing Sheets

U.S. PATENT DOCUMENTS

| | | | |
|---|---|---|---|
| 8,200,423 B2 * | 6/2012 | Dietsch et al. | 701/409 |
| 8,320,939 B1 * | 11/2012 | Vincent | 455/456.1 |
| 2002/0055817 A1 | 5/2002 | Chou | |
| 2005/0130677 A1 | 6/2005 | Meunier et al. | |
| 2005/0143091 A1 | 6/2005 | Shapira et al. | |
| 2005/0246334 A1 * | 11/2005 | Tao et al. | 707/5 |
| 2006/0069526 A1 | 3/2006 | Kaiser et al. | |
| 2007/0188318 A1 | 8/2007 | Cole et al. | |
| 2007/0271011 A1 | 11/2007 | Lee et al. | |
| 2008/0033645 A1 * | 2/2008 | Levinson et al. | 701/213 |
| 2008/0161011 A1 | 7/2008 | Babin et al. | |
| 2008/0180637 A1 | 7/2008 | Kjeldsen et al. | |
| 2008/0255758 A1 | 10/2008 | Graham et al. | |
| 2009/0005975 A1 | 1/2009 | Forstall et al. | |
| 2009/0023459 A1 | 1/2009 | Wigren | |
| 2009/0043504 A1 | 2/2009 | Bandyopadhyay et al. | |
| 2009/0102719 A1 | 4/2009 | Lin | |
| 2009/0201149 A1 | 8/2009 | Kaji | |
| 2009/0291641 A1 | 11/2009 | Sato et al. | |
| 2010/0011022 A1 | 1/2010 | Sugimoto et al. | |
| 2010/0026569 A1 | 2/2010 | Amidi | |
| 2010/0049431 A1 | 2/2010 | Zetune | |
| 2010/0070078 A1 | 3/2010 | Kong et al. | |
| 2010/0121488 A1 | 5/2010 | Lee et al. | |
| 2010/0127935 A1 | 5/2010 | Huang et al. | |
| 2010/0159958 A1 | 6/2010 | Naguib et al. | |
| 2010/0246405 A1 | 9/2010 | Potkonjak | |
| 2010/0279712 A1 | 11/2010 | Dicke et al. | |
| 2011/0082638 A1 | 4/2011 | Khorashadi et al. | |
| 2011/0211563 A1 | 9/2011 | Herrala et al. | |
| 2011/0221897 A1 | 9/2011 | Haddick et al. | |
| 2012/0086599 A1 | 4/2012 | Mo et al. | |
| 2012/0130632 A1 | 5/2012 | Bandyopadhyay et al. | |
| 2012/0290254 A1 | 11/2012 | Thrun et al. | |

FOREIGN PATENT DOCUMENTS

| | | |
|---|---|---|
| WO | 2010067348 A1 | 6/2010 |
| WO | 2010106530 A2 | 9/2010 |
| WO | 2011042727 A2 | 4/2011 |

OTHER PUBLICATIONS

International Search Report and Written Opinion for Application No. PCT/US2012/037235 dated Aug. 29, 2012.

International Search Report and Written Opinion dated Nov. 23, 2012, in International Application No. PCT/ US2012/037259.

"Kidnapped Robot Problem" [online]. [Retrieved Feb. 16, 2011] Retrieved from the internet: <http://en.wikipedia.org/wiki/Kidnapped_robot_problem, 1 page.

Adam Milstein, Occupancy Grid Maps for Localization and Mapping, Jun. 2008, 28 pages.

Juan D. Tardos, Jose Neira, Maria De Luna, Paul M. Newman, John J. Leonard, Robust Mapping and Localization in Indoor Environments Using Sonar Data, Jun. 24, 2002, 39 pages.

Lasse Klingbeil and Tim Wark, A Wireless Sensor Network for Real-Time Indoor Localisation and Motion Monitoring, 2008, 12 pages, IEEE Computer Society.

M. Sanjeev Arulampalam, Simon Maskell, Neil Gordon, and Tim Clapp, A Tutorial on Particle Filters for Online Nonlinear/Non-Gaussian Bayesian Tracking, 2002, 15 pages.

Paramvir Bahl and Venkata N. Padmanabhan, Radar: An In-Building RF-Based User Location and Tracking System, 2008, 10 pages.

Siddhartha Saha, Kamalika Chaudhuri, Dheeraj Sanghi, Pravin Bhagwat, Location Determination of a Mobile Device Using IEEE 802.11b Access Point Signals, 2003, 6 pages.

Yiming Ji, Saad Biaz, Santosh Pandey, Prathima Agrawal, Ariadne: A Dynamic Indoor Signal Map Construction and Localization System, Jun. 19, 2006, 14 pages.

* cited by examiner

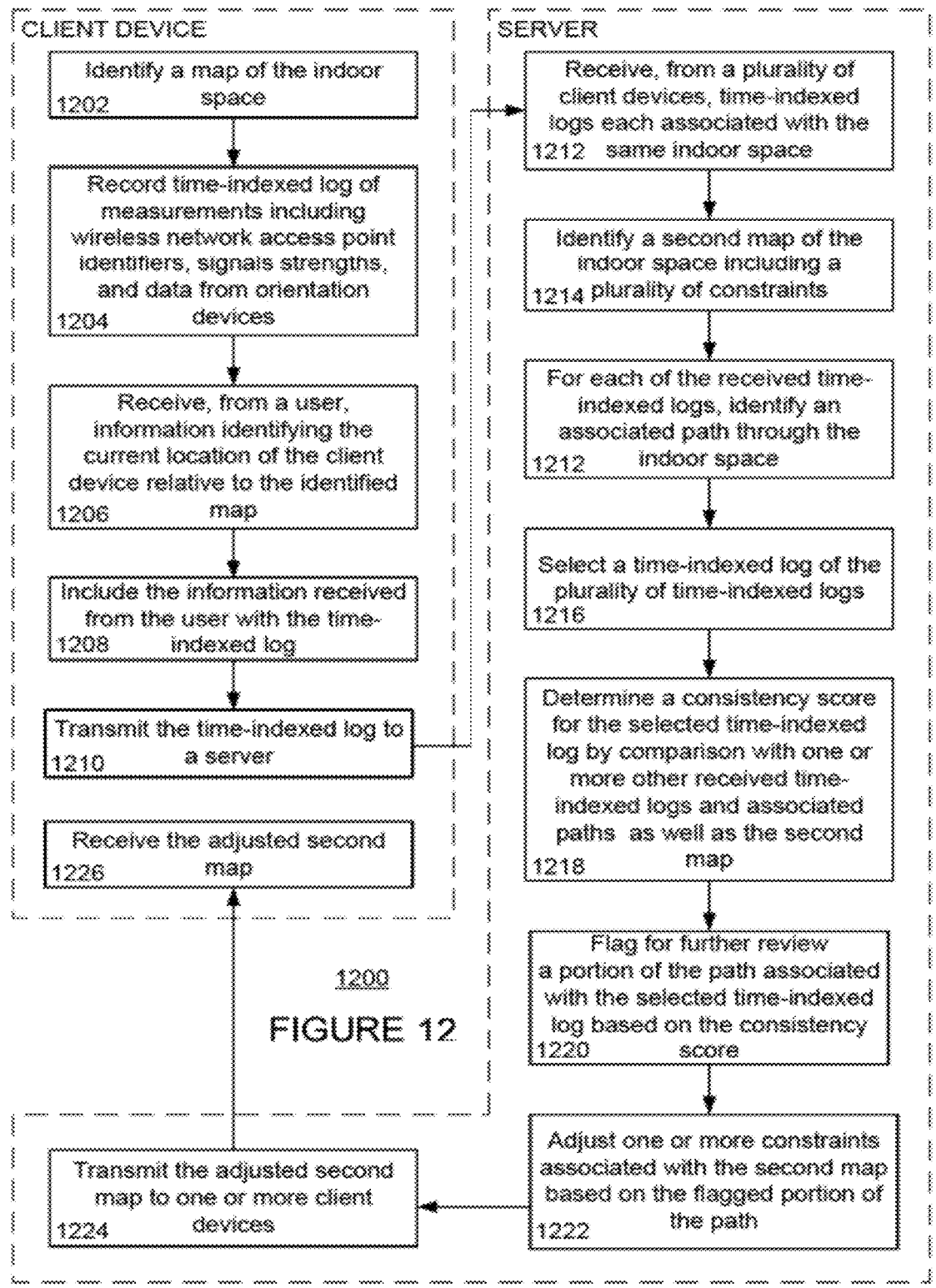

QUALITY CONTROL OF MAPPING DATA

BACKGROUND

Modern smartphone devices are equipped with location features. These devices use signals from GPS satellites to identify a location, determine a direction of motion, and other navigation functions. However, in locations where the GPS satellite signals are weak, for example, when these devices are indoors, GPS may not function well or at all.

Some systems provide indoor navigation by using other information, such as wireless network signals, Bluetooth signals, compass data and accelerometer data as well as existing floor plans and pre-generated databases or indices of measurements. However, in order to enable reliable and effective localization in a particular building, data must be collected throughout the building. This may require having an individual walk a collection device, such as a mobile phone, through various locations in the building in order to collect all of the data. In some examples, the data collected by a device may be inaccurate, such as where location estimations are incorrect or low quality or where there are errors in the existing floor plan because of incorrect data or recent changes to a building.

SUMMARY

One aspect of the disclosure provides a method of flagging survey data. The method includes receiving, from a plurality of client devices, time-indexed logs recorded while each client device was moved through an indoor space, wherein the indoor space is the same for each time-indexed log; identifying a map of the indoor space; for each of the received time-indexed logs, identifying an associated path through the indoor space; selecting one of the received time-indexed logs; determining, by a processor, a consistency score for the selected time-indexed log based on the selected time-indexed log and one or more other of the received time-indexed logs and the identified map of the indoor space; and flagging, for further review, a portion of the path associated with the selected time-indexed log based on the consistency score.

In one example, the selected time-indexed log includes data received from a user indicating a current location of the corresponding client device and identifying the associated path for the selected time-indexed log is based on the data received from the user. In another example, the selected time-indexed log includes data received from one or more orientation devices and identifying the associated path for the selected time-indexed log is based on the data received from the one or more orientation devices. In yet another example, the selected time-indexed log includes data identifying one or more wireless network access point locations and associated signal strengths and identifying the associated path for the selected time-indexed log is based on the data identifying the one or more wireless network access point locations and the associated signal strengths. In a further example, the method also includes using the identified paths associated with the received time-indexed logs, except the flagged portion of the path associated with the selected time-indexed log, to generate a wireless network access point location and signal strength model. In another example, the identified map includes a plurality of constraints and the method further comprises adjusting one or more of the plurality of constraints associated with the identified map based on the flagged portion of the path associated with the selected time-indexed log to generate an adjusted map. In yet another example, the method also includes transmitting the adjusted map to a client device. In a further example, the plurality of constraints are walls in the indoor space. In another example, the plurality of constraints are rails representing locations where a user may walk within an indoor space. In a further example, determining the consistency score for the selected time-indexed log also includes generating a first model of the indoor space based on the selected time-indexed logs and the identified map of the indoor space; generating a second model of the indoor space based on the one or more other time-indexed logs and the identified map of the indoor space; and comparing the first model to the second model.

Another aspect of the invention provides a device for flagging survey data. The device includes memory storing a map of the indoor space. The device also includes a processor coupled to the memory. The processor is operable to receive, from a plurality of client devices, time-indexed logs recorded while each client device was moved through an indoor space, wherein the indoor space is the same for each time-indexed log; identify a map of the indoor space; for each of the received time-indexed logs, identify an associated path through the indoor space; select one of the received time-indexed logs; determine a consistency score for the selected time-indexed log based on the selected time-indexed log and one or more other of the received time-indexed logs and the identified map of the indoor space; and flag, for further review, a portion of the path associated with the selected time-indexed log based on the consistency score.

In one example, the selected time-indexed log includes data received from a user indicating a current location of the corresponding client device, and the processor is further operable to identify the associated path for the selected time-indexed log based on the data received from the user. In another example, the selected time-indexed log includes data received from one or more orientation devices, and the processor is further operable to identify the associated path for the selected time-indexed log based on the data received from the one or more orientation devices. In yet another example, the selected time-indexed log includes data identifying one or more wireless network access point locations and associated signal strengths, and the processor is further operable to identify the associated path for the selected time-indexed log based on the data identifying the one or more wireless network access point locations and the associated signal strengths. In a further example, the processor is further operable to use the identified paths associated with the received time-indexed logs, except the flagged portion of the path associated with the selected time-indexed log, to generate a wireless network access point location and signal strength model. In another example, the identified map includes a plurality of constraints, and the processor is further operable to adjust one or more of the plurality of constraints based on the flagged portion of the path associated with the selected time-indexed log to generate an adjusted map. In yet another example, the processor is further operable to transmit the adjusted map to a client device. In a further example, the plurality of constraints are walls in the indoor space. In a further example, the plurality of constraints are rails representing locations where a user may walk within an indoor space. In another example, the consistency score is further determined by the processor by generating a first model of the indoor space based on the selected time-indexed logs and the identified map of the indoor space; generating a second model of the indoor space based on the one or more other time-indexed logs and the identified map of the indoor space; and comparing the first model to the second model.

BRIEF DESCRIPTION OF THE DRAWINGS

FIG. 12 is a flow diagram in accordance with an exemplary embodiment.

DETAILED DESCRIPTION

In one aspect, a client device may identify a map of an indoor space. This map may be displayed to a user. The client device may record a time-indexed log of measurements while being moved through the indoor space. In some examples, the displayed map may show an approximate location and path of the client device in the indoor space. The client device may receive from the user information identifying the current location of the client device relative to the map. For example, the user may select a location by touching a portion of the map, if the map is displayed on a touch-screen display. This information received from the user may be incorporated included in the time-indexed log. For example, the time-indexed log may include wireless network access point identifiers, associated signal strengths, as well as data received from one or more orientation devices, or other devices. The time indexed-log may be transmitted to a server. In one example, the log may be transmitted as it is being recorded, or alternatively, once the user has selected to do so.

The server may then receive time-indexed logs from the same indoor space from a plurality of client devices. The server may identify a second map of the indoor space including a plurality of constraints. For example, the constraints may include walls or rails as described above. For each of the received time-indexed logs, the server may identify an associated path through the indoor space. For example, the path may be identified based on the details of the log, including, the wireless network access point identifiers and signal strengths, the data received from the orientation devices and any other devices, as well as the information identifying current locations of the client device provided by the user.

The server may then select a time-indexed log of the plurality of time-indexed logs. Alternatively, the server may select a path of the identified associated paths for the received time-indexed logs. The server may determine a consistency score for the selected time-indexed log by comparison with one or more other received time-indexed logs and associated paths as well as the second map. A portion of the path associated with the selected time-indexed log may be flagged for further review based on the consistency score. In one example, a person may be sent to reexamine the flagged portion. In another example, the server may adjust one or more constraints associated with the second map based on the flagged portion of the path and transmits the adjusted second map to one or more client devices. The adjusted second map may be received by a client device.

Figure 1:
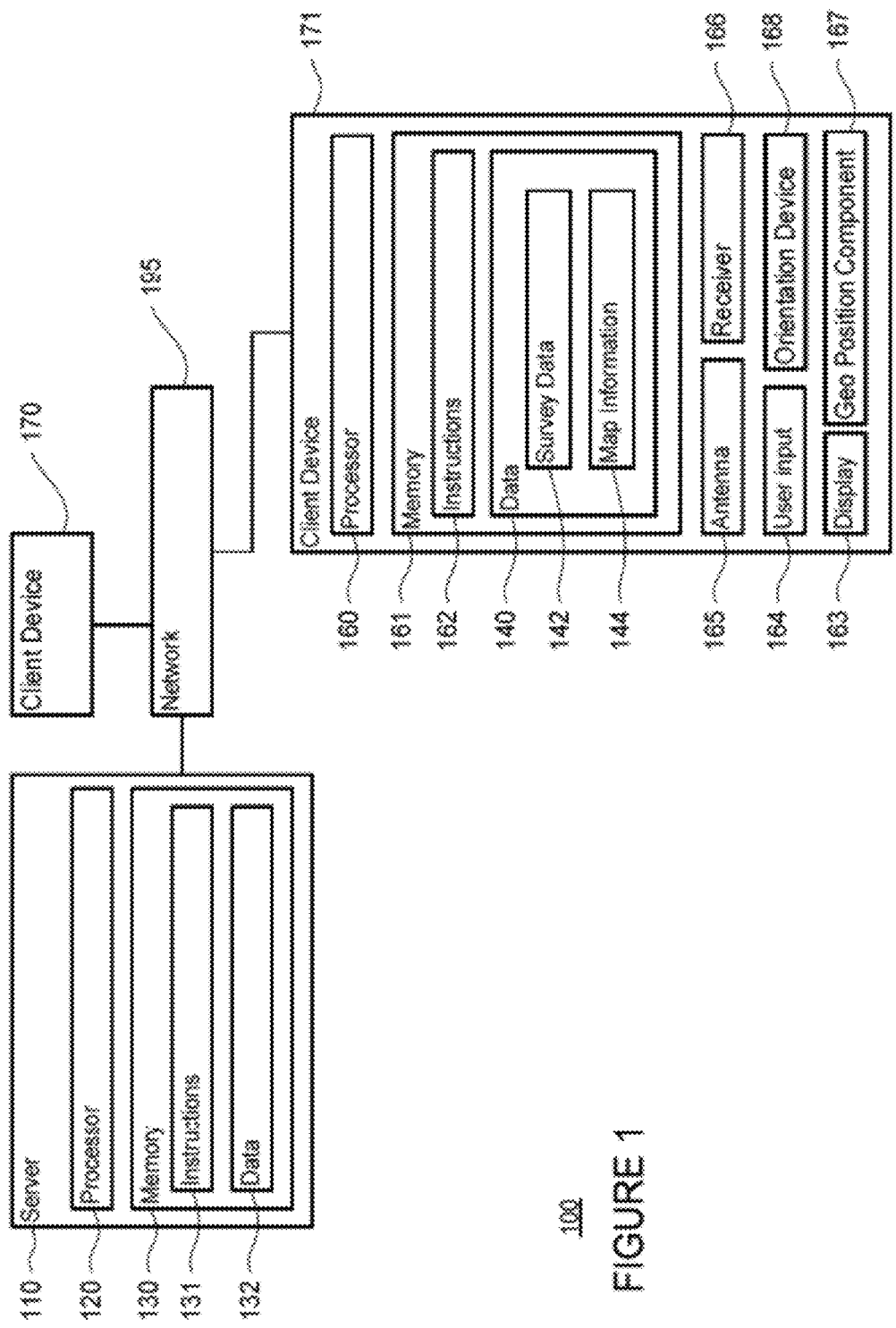
FIG. 1 is a functional diagram of a system in accordance with an exemplary embodiment.
Figure 2:
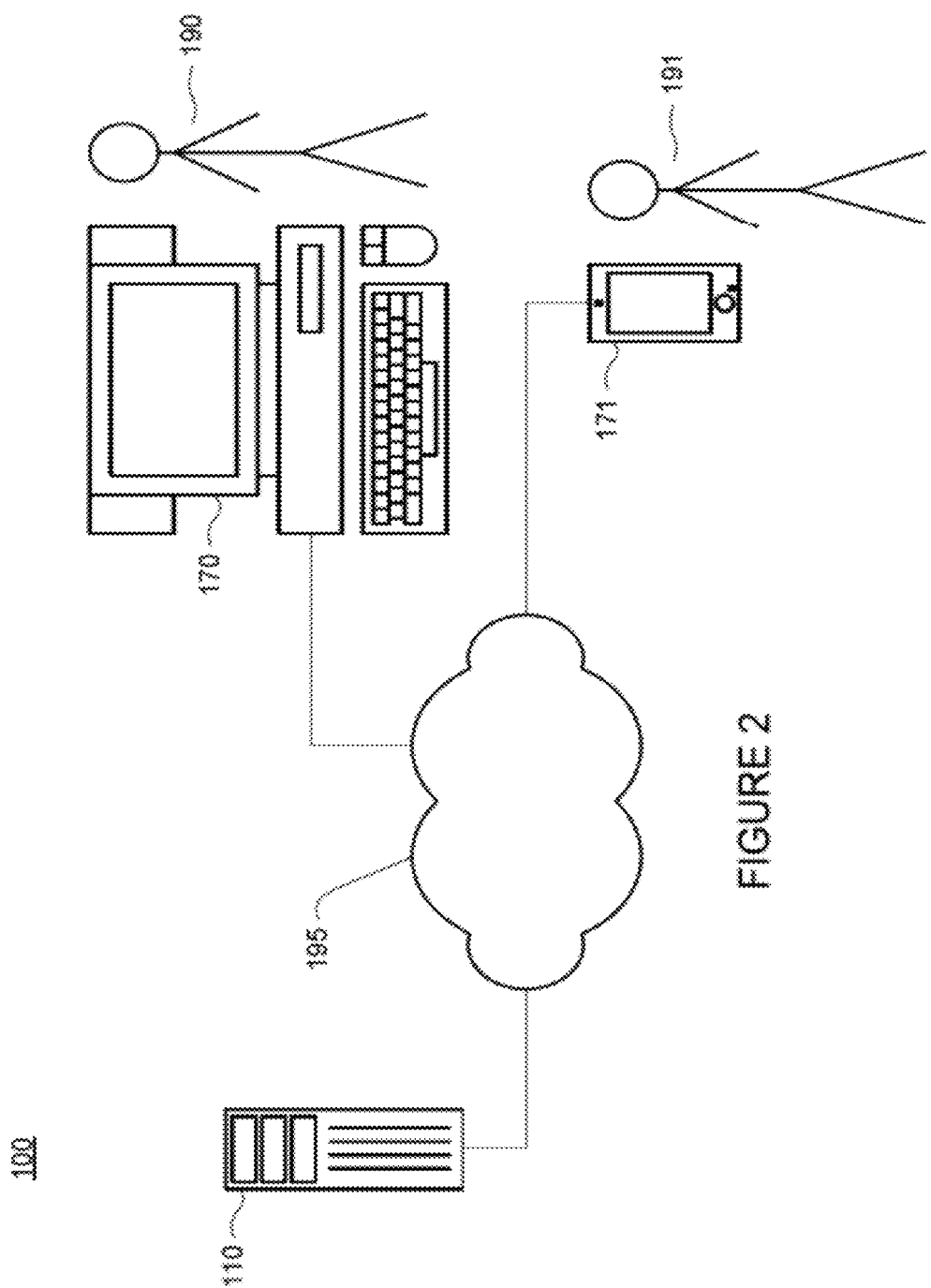
FIG. 2 is a pictorial diagram of a system in accordance with an exemplary embodiment.

As shown in FIGS. 1-2, an exemplary system 100 may include computers 110, 170, and 171. Computer 110 may contain a processor 120, memory 130 and other components typically present in general purpose computers.

Memory 130 of computer 110 stores information accessible by processor 120, including instructions 131 that may be executed by the processor 120. Memory also includes data 132 that may be retrieved, manipulated or stored by the processor. The memory may be of any type capable of storing information accessible by the processor, such as a hard-drive, memory card, ROM, RAM, DVD, CD-ROM, write-capable, and read-only memories. Systems and methods may include different combinations of the foregoing, whereby different portions of the instructions and data are stored on different types of media.

The instructions 131 may be any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Data 132 may be retrieved, stored or modified by processor 120 in accordance with the instructions 131. For instance, although the system and method is not limited by any particular data structure, the data may be stored in computer registers, in a relational database as a table having a plurality of different fields and records, or XML documents. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information that is used by a function to calculate the relevant data.

The processor 120 may be any conventional processor, such as commercially available CPUs. Alternatively, the processor may be a dedicated controller such as an ASIC or other hard-ware-based processor. Although FIG. 1 functionally illustrates the processor and memory as being within the same block, it will be understood by those of ordinary skill in the art that the processor and memory may actually comprise multiple processors and memories that may or may not be stored within the same physical housing. For example, memory may be a hard drive or other storage media located in a server farm of a data center. Accordingly, references to a processor, memory, or computer will be understood to include references to a collection of processors, memories or computers that may or may not operate in parallel.

The computer 110 may be at one node of a network 195 and capable of directly and indirectly communicating with other nodes of the network. For example, computer 110 may comprise a web server that is capable of communicating with client devices 170-71 via network 195 such that server 110 uses network 195 to transmit and display information to user 190 on display of client device 170. Server 110 may also comprise a plurality of computers, e.g., a load balanced server farm, that exchange information with different nodes of a network for the purpose of receiving, processing and transmitting data to the client devices. In this instance, the client devices will typically still be at different nodes of the network than any of the computers comprising server 110.

Each client device may be configured similarly to the server 110, with a processor 160, memory 161, instructions 162, and data 140. Each client computer 170-71 may be a personal computer, intended for use by a person 190-91, having all the internal components normally found in a personal computer such as a central processing unit (CPU), display device 163 (for example, a monitor having a screen, a projector, a touch-screen, a small LCD screen, a television, or another device such as an electrical device that is operable to display information processed by the processor), CD-ROM, hard-drive, user input 164 (for example, a mouse, keyboard, touch-screen or microphone), speakers, modem and/or network interface device (telephone, cable or otherwise) and all of the components used for connecting these elements to one another. Moreover, computers in accordance with the systems and methods described herein may comprise any device capable of processing instructions and transmitting data to and from humans and other computers including general purpose computers, PDAs, network computers lacking local storage capability, set-top boxes for televisions, and other networked devices.

Although the computers 170-71 may comprise a full-sized personal computer, the system and method may also be used in connection with mobile devices capable of wirelessly exchanging data with a server over a network such as the Internet. By way of example only, client device 171 may be a wireless-enabled PDA, hand-held or in-car navigation device, tablet PC, netbook, or a cellular phone capable of obtaining information via the Internet. The user may input information, for example, using a small keyboard, a keypad, or a touch screen.

The server 110 and client computers 170-71 are capable of direct and indirect communication, such as over network 195. Although only a few computers are depicted in FIGS. 1-2, it should be appreciated that a typical system can include a large number of connected computers, with each different computer being at a different node of the network 195. The network, and intervening nodes, may comprise various configurations and protocols including the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computers, such as modems (e.g., dial-up, cable or fiber optic) and wireless interfaces.

Although certain advantages are obtained when information is transmitted or received as noted above, other aspects of the system and method are not limited to any particular manner of transmission of information. For example, in some aspects, information may be sent via a medium such as a disk, tape or CD-ROM. Yet further, although some functions are indicated as taking place on a single client device having a single processor, various aspects of the system and method may be implemented by a plurality of computers, for example, communicating information over network 195.

The client devices may include an antenna 165 and receiver 166 which may be used to scan the wireless network spectrum and identify local wireless network signals. For example, the antenna may receive "beacon" messages and send them to the receiver which demodulates the information to identify wireless network access points. In one example, these beacon messages may be IEEE 802.11 management frames transmitted by access points to announce themselves to potential wireless network users. These frames may contain Service Set Identifiers ("SSID") information as well as physical layer parameters that assist devices in connecting to the wireless network. The beacon messages may also include additional network access information which also assists devices in accessing the network, including whether the access point is accepting new users, whether the data is encrypted, and which type of authentication is being used, for example, no authentication (open to all), password based, web-portable based, or Media Access Control ("MAC") address based. However, it will be understood that data collected in accordance with this disclosure may be limited to the information discussed above, for example MAC addresses, SSIDs or other identifiers and signal strengths, and need not contain additional information. For example, information contained in the network traffic or payload data, such as personal information, need not be collected, and in fact, may actually be removed in order to protect the privacy of the wireless network's users.

The geographic position component 167 may include a GPS receiver to determine the device's latitude, longitude and/or altitude position. The geographic position component may also comprise software for determining the position of the device based on other signals received at the client device 160, such as an IP address or signals received at a cell phone's antenna from one or more base stations if the client device is a cell phone.

The client devices may also include an orientation device 168, for example an accelerometer, gyroscope, compass and orientation-related software to determine the direction in which the device is oriented. By way of example only, the device may determine its pitch, yaw or roll (or changes thereto) relative to the direction of gravity or a plane perpendicular thereto. In that regard, it will be understood that a client device's provision of orientation data as set forth herein may be provided automatically to the client device. In some examples, the accelerometer, gyroscope and/or compass devices may be used as a pedometer to track a client device's movements (for example, the number of steps by a user when the client device is in a user's hand or pocket, etc.).

The orientation data received from the orientation device may be used in various ways. For example, an accelerometer or gyroscope may be used as a pedometer by running an average of the acceleration values to identify which direction is down (towards the Earth). A simple step detector may be constructed by deciding a step has been taken each time the component in the down direction is greater than an empirically-determined threshold.

Instructions 162 may also include data collection software for collecting the information identified during the scanning and transmitting the information to a server. The data collection software may include applications or "widgets" available for a wide variety of mobile phones. For portable computers, data collection functionality may be included in toolbars and other such browser add-ons which may be used with a variety of browser programs. Data may also be collected by devices equipped with wireless network scanning gear and a receiver which monitors a wireless network frequency spectrum. For example, many wireless network access points may operate in the 2.4 GHz frequency band and the signals may be based on 802.11, 802.11b, g, n, or other such standards.

Data 140 may include survey data 142 generated by the data collection software. The survey data points may include wireless network access point identifiers (such as SSIDs or MAC addresses) as well as the associated signal strengths. Again, this information need not include any payload data or personal information. The survey data may also include data generated by one or more orientation devices as the wireless network access point identifiers and associated signal strengths are being collected.

Figure 3A:
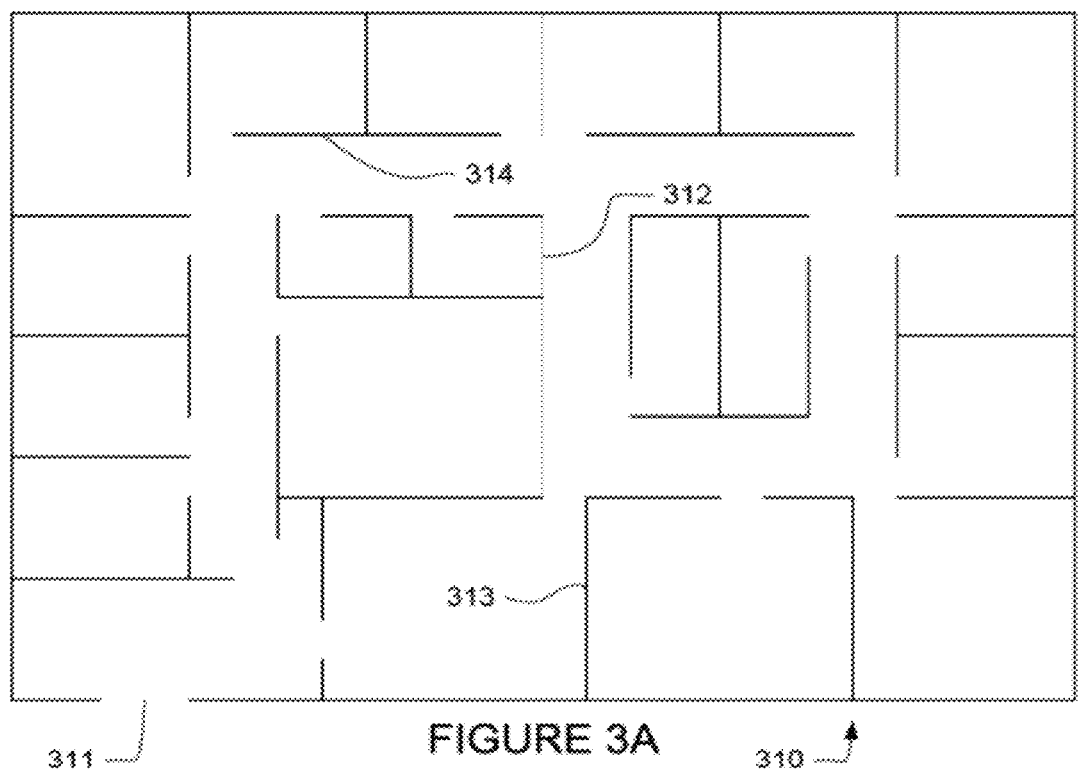
FIGS. 3A-3C are maps in accordance with exemplary embodiments.

The client device may access map information 144. As described in more detail below the map information may include a series of maps representing the indoor spaces such as a floor plan of a building. For example, as shown in FIG. 3A a map 310 includes an entrance 311; a plurality of walls (such as walls 312-314) defining various rooms, hallways, etc., as well as openings (such as doorways) of an indoor space. These features may enable to users to identify various areas of the indoor space.

Figure 3B:
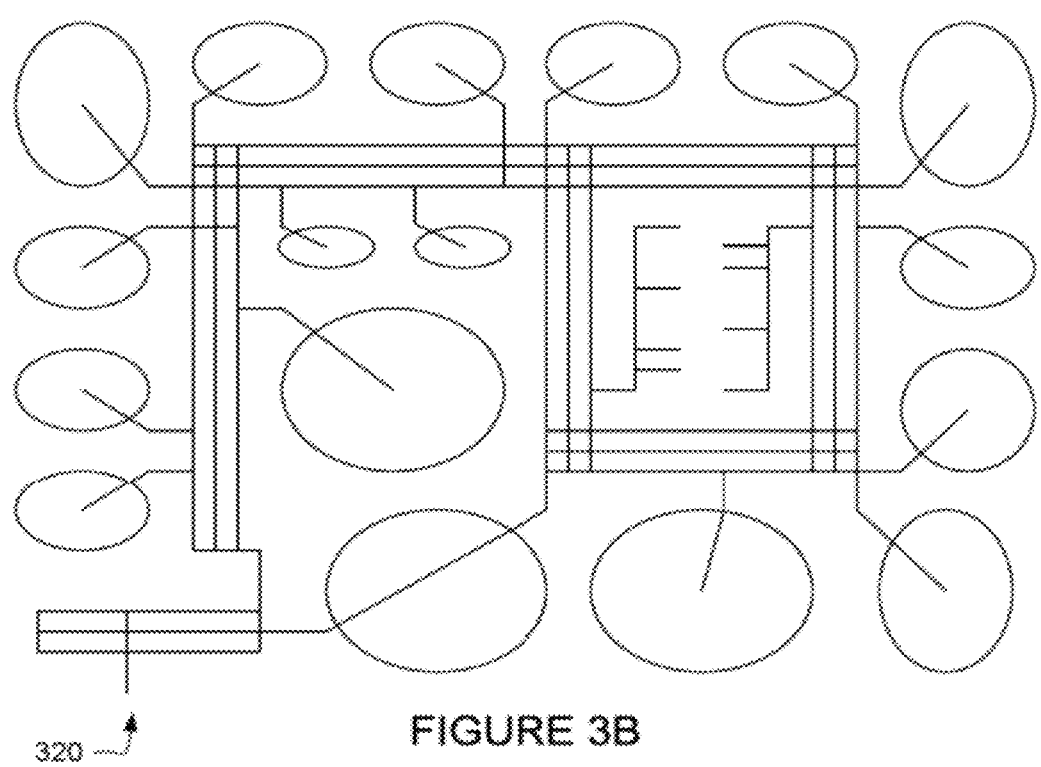
Figure 3C:
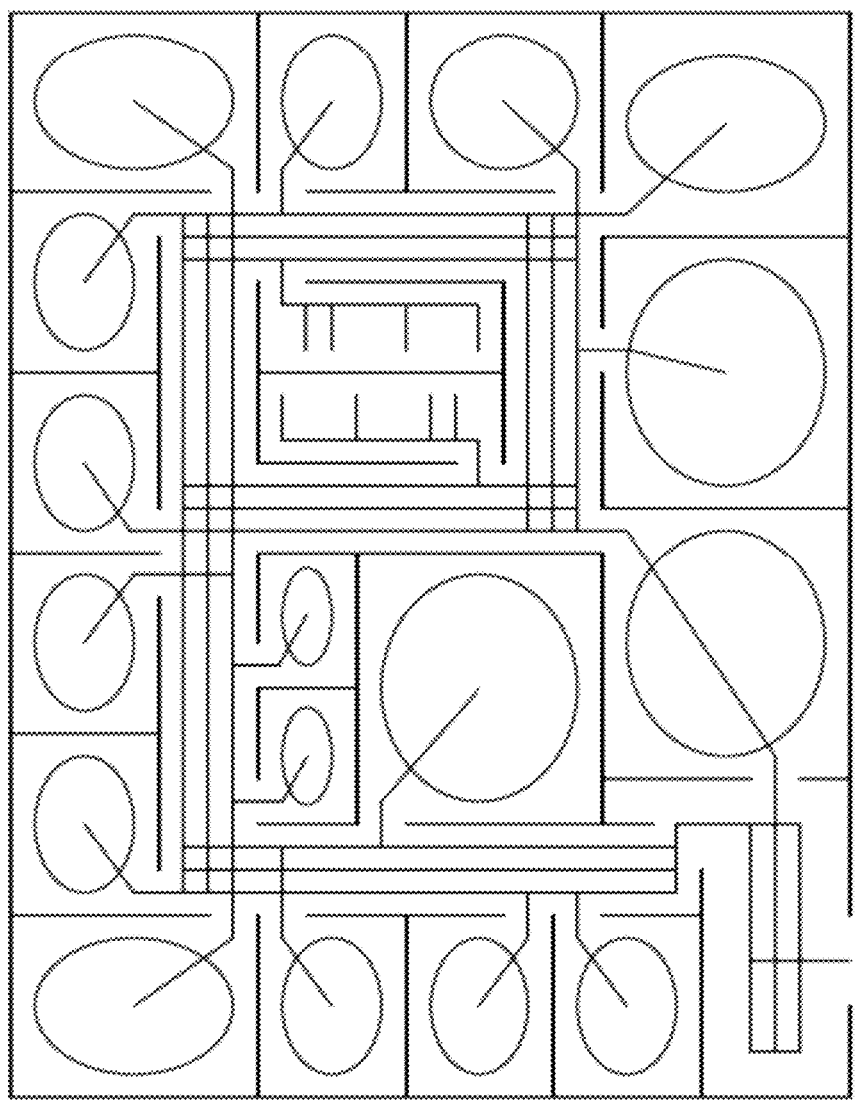

This map information may be stored locally at the client device. Alternatively, no map information or only a portion of the map information may be stored locally at the client device while the bulk of the map information is maintained by the server. In this example, any additional map information may be requested from the server as needed. For example, the server may also have access to server map information. Some or all of the server map information may be transmitted to a client device upon request as explained above. In this example, the server map information may similar to the map information described above where the map information is based upon a series of walls representing locations where a user may not walk (or is not able to walk) within an indoor space as shown in FIG. 3A. Alternatively, or in addition to the wall based maps, the map information may be based upon a series of rails representing locations where a user may walk within an indoor space. For example, FIG. 3B depicts an exemplary diagram of a rail system 320 of the same indoor space of FIG. 3A. The rails represent the locations at or near which a person is likely to walk in the indoor space. To illustrate this, FIG. 3C depicts rail system 320 on map 310.

In addition to the operations described below and illustrated in the figures, various operations will now be described. It should also be understood that the following operations do not have to be performed in the precise order described below. Rather, various steps may be handled in a different order or simultaneously. Steps may also be omitted or added unless otherwise stated herein.

A user may sign up or opt to participate (a "participant") in walking his or her client device through the indoor space in order to collect the survey data described above. Participants may be required to take an affirmative step in order to select or "opt-in" to participate. For example, participants may be required to sign in to a service before receiving the route or providing any information. Participants may be paid for the data provided and may also be provided with an explanation of how and why their feedback is being used. Similarly, participants may be provided with the opportunity to cease participation temporarily or permanently at any time.

Figure 4:
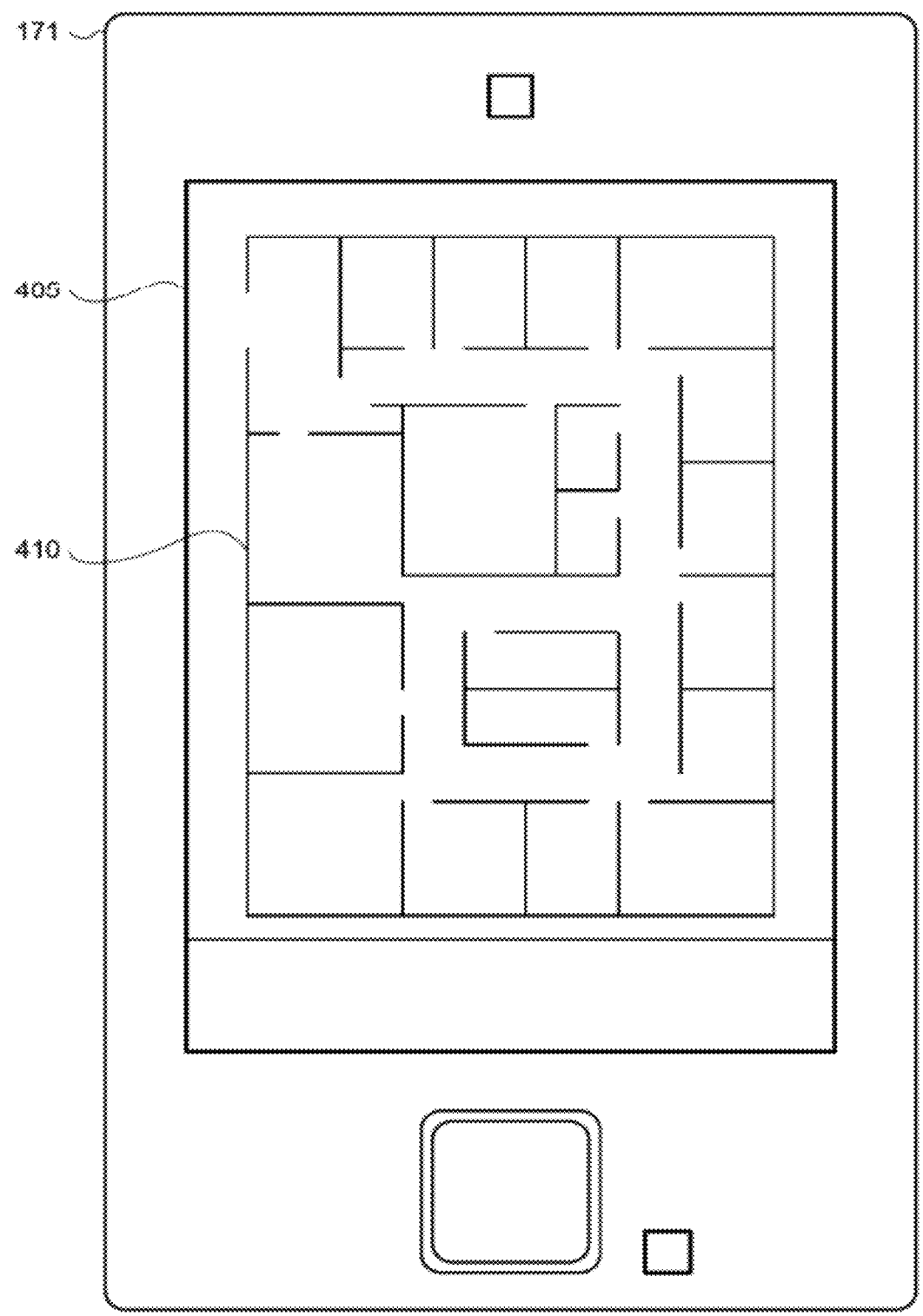
FIG. 4 is a screen shot and client device in accordance with an exemplary embodiment.
Figure 5:
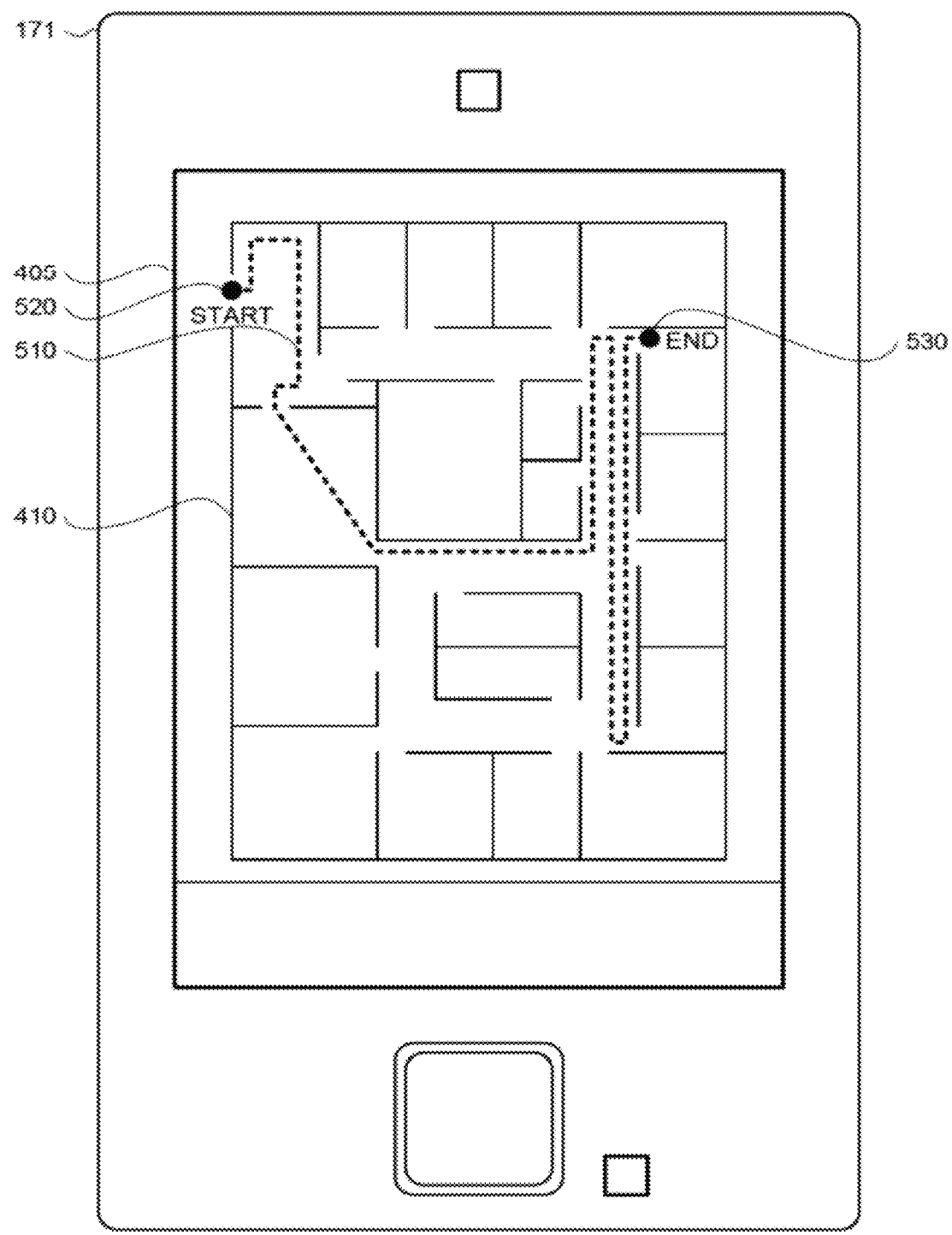
FIG. 5 is a screen shot and client device in accordance with an exemplary embodiment.

After opting to participate, the participant's client device may identify a relevant map of an indoor space and display it on a display of the client device. For example, the map may be provided to the participant automatically based on his or her last known GPS location (i.e. immediately before entering a building) or based on an address or other identifying information in putted by the user. For example, as shown in FIG. 4, client device 171 displays a map 410 of "Building A" on display 405. In some examples, the participant may receive the map from the server along with a route that the participant should follow. For example, as shown in FIG. 5, map 410 also includes route 510 with a starting point 520 and an ending point 530 for the participant to follow through the indoor space while the client device collects survey data.

While the participant walks through the indoor space (in some examples, following the route), the client device may record a time-indexed log of measurements from one or more orientation devices, for example accelerometers and/or gyroscopes, and wireless network access point identifiers. For example, the log may include a timestamp, orientation and compass measurements, wireless network access point identifiers (MAC address and/or SSIDs), and signals strengths. Again, this data need not include any payload information, but only that necessary to identify a wireless network access point (or other wireless network identifier) and its associated signal strength.

For every unit of time along the route, the client device may record a log entry for that location. For example, a log entry may be recorded periodically, such as every 0.1 seconds. This data may be transmitted to the server as it is collected or the user may select to transmit the data once the user has finished walking through the indoor space (or once the route has been completed).

Figure 6:
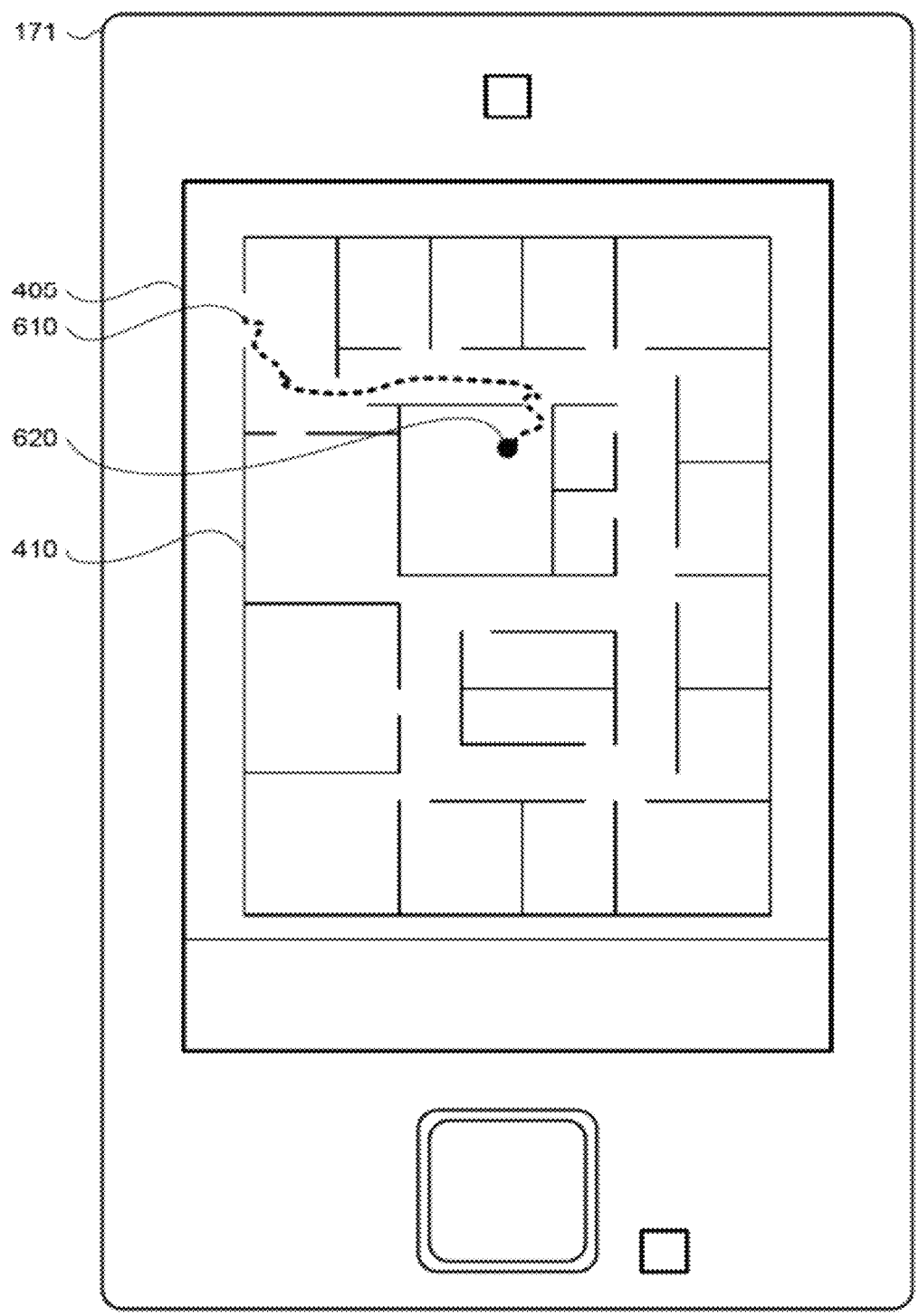
FIG. 6 is a screen shot and client device in accordance with an exemplary embodiment.

In some examples, the client device may display an estimated current location as well as the path followed by the user. The client device may identify a starting position based on a user-input position or it may employ a coarse wireless network access point proximity-based localization algorithm, for example, that makes use of a stored set of wireless network access point locations such as a model built from previous surveys of the same area. The client device may use data from the orientation devices to estimate the movements of the client device relative to the map. For example, as shown in FIG. 6, client device 171 displays an estimated path 610 followed by the client device to the estimated current location 620.

Figure 7B:
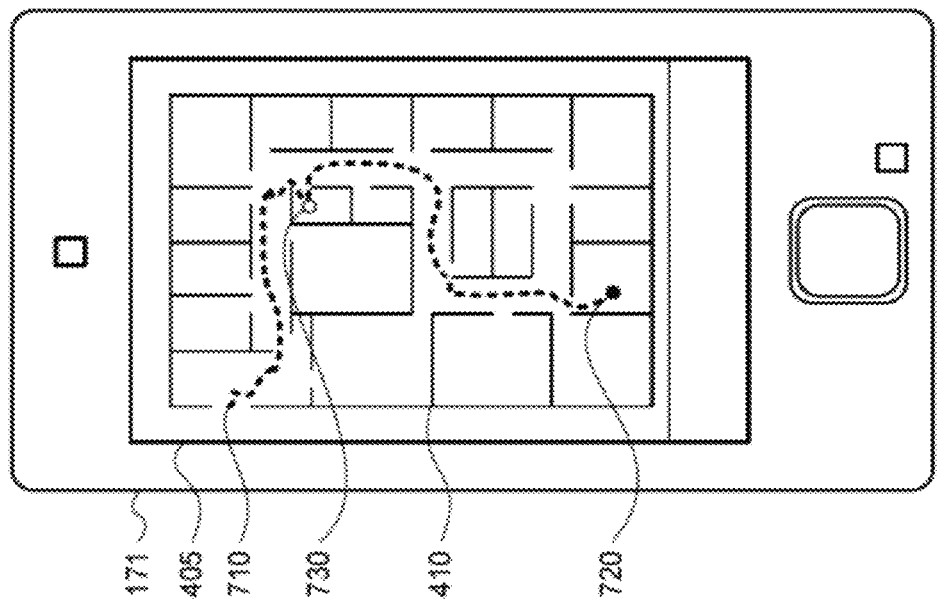
FIG. 7A-7B are screen shots and client devices in accordance with exemplary embodiments.
Figure 7A:
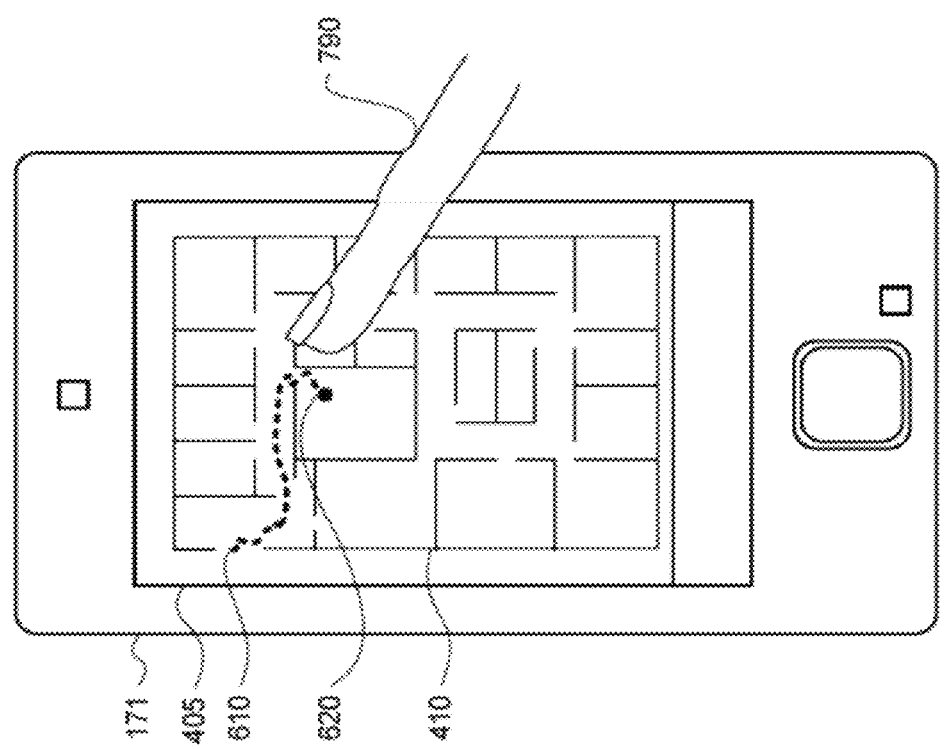

In some examples, while the participant walks through the indoor space, he or she may "drop" location markers. For example, as shown in FIG. 7A a participant may use his or her finger 790 to select the participant's (and the client device's) current location on map 410. If the client device's estimate of its current location is not the same as the current location indicated by the participant, this information may be used to "correct" the client device's location as well as the path. For example, as shown in FIG. 7B, path 710 has been adjusted from path 610 to fit marker 730 in order compensate for the location indication by the participant. Display 405 also indicates the estimated current location of the client device as the device continues to move through the indoor space. The marker may also be included in the survey data and transmitted to the server for further processing.

Once received, the survey data may be processed by a server. In one example, the data may be used to identify the path (or the various locations) of the client device in the indoor space. Again the survey data may include time-indexed log of measurements from one or more orientation devices, wireless network access point identifiers, signal strengths, as well as any markers dropped by the participant. The path may be determined by referring to the map (including walls or a rail system) of the indoor location and a localization algorithm, for example, a particle filter or least squares optimizer. In some examples, path data for multiple surveys of the same indoor space may be used to generate wireless network access point location and signal strength models for the indoor space, for example, to be used for future localization and/or navigation through the indoor space.

The survey data and the path may be compared to other survey data and paths of the indoor space as well as the map in order to provide an estimate of the quality of the localization produced overall and for each part of the survey data. For example, each survey's data, including the survey's path, the locations of the paths, and the approximate locations of the wireless network access point identifiers may be compared to other survey data as well as the map in order to determine a consistency score for the survey as well as each segment of the survey.

A survey may be partitioned into segments, from example, by dividing by a set time period or number of meters. In another example, the survey may be segmented by treating it like a network, made up of edges and nodes, where each node may comprise a segment.

The segmented (or unsegmented) survey may be used to build a first wireless network access point model which identifies the wireless network access point signals and associated strengths for different locations. The first model may be compared to a second model generated from data from one or more other surveys in order to identify how large the differences are between the first model and the second model. The models as a whole or only segments may be compared. The larger the differences the lower the confidence in the quality of the survey of the first model and the lower the consistency score.

If the consistency score indicates that the survey did not produce a high quality localization overall or it did not give high quality localization for one or more particular areas of the map, the particular area of the map may be flagged for further review in order to determine whether the features of the map (the walls and the rails) are incorrect. In one example, a high consistency score may indicate a high quality localization, while a lower consistency score may indicate a lower quality localization. In another example, the map may include a partition wall which is actually a temporary barrier, such as a partition in a conference room which has since been moved. If the surveyor walks through the original location of the partition wall (in the map, simply a wall), the post-processing techniques such as particle filters, etc., which use the map may be less likely to suggest that the surveyor had passed through the partition wall. The variance in the location of the particles may increase, the this may be used as a signal that there was a lower quality localization.

Figure 8A:
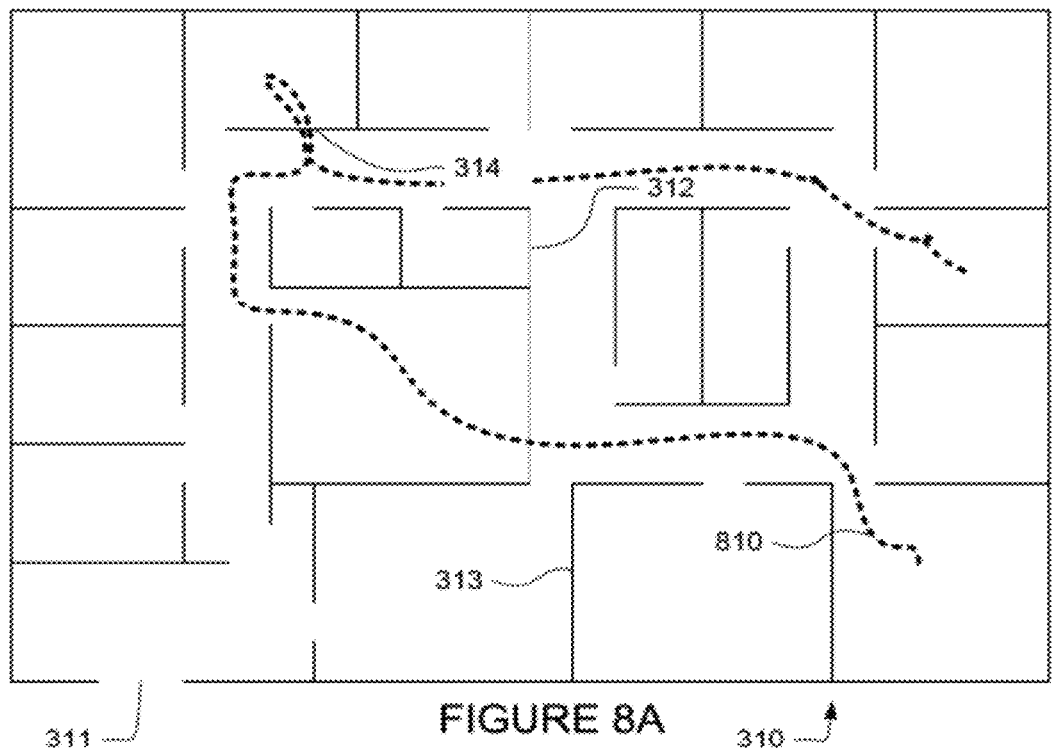
FIGS. 8A-8B are maps and data in accordance with exemplary embodiments.
Figure 8B:
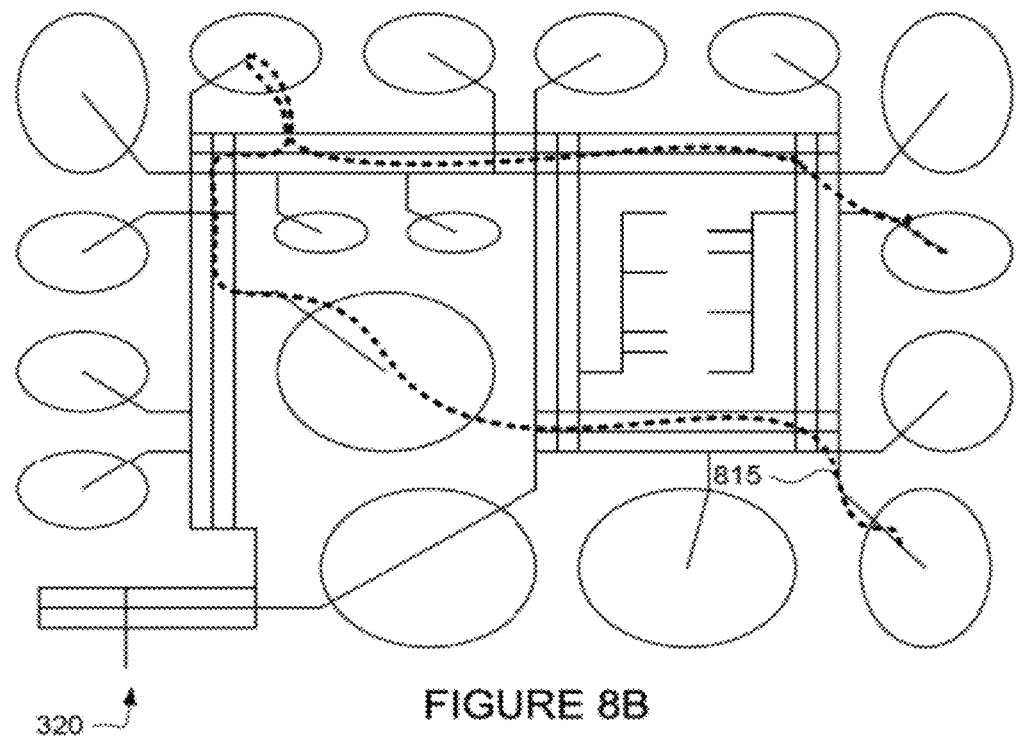
Figure 9A:
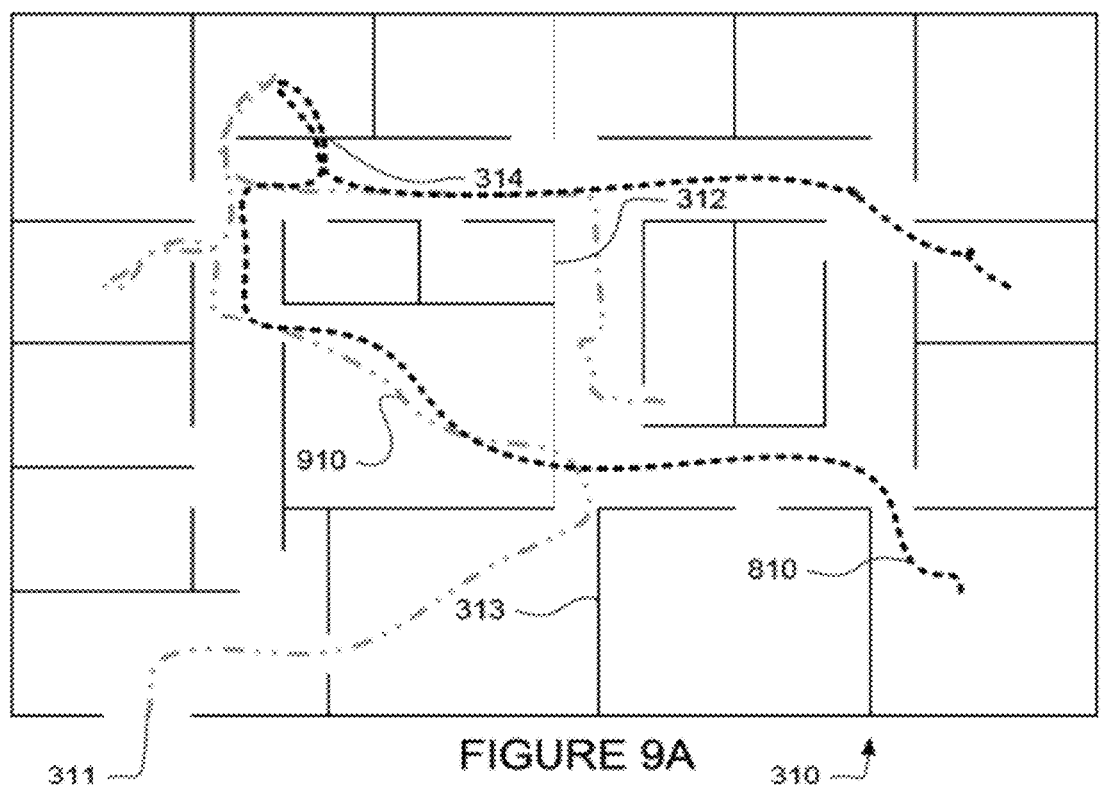
FIGS. 9A-9B are maps and data in accordance with exemplary embodiments.
Figure 9B:
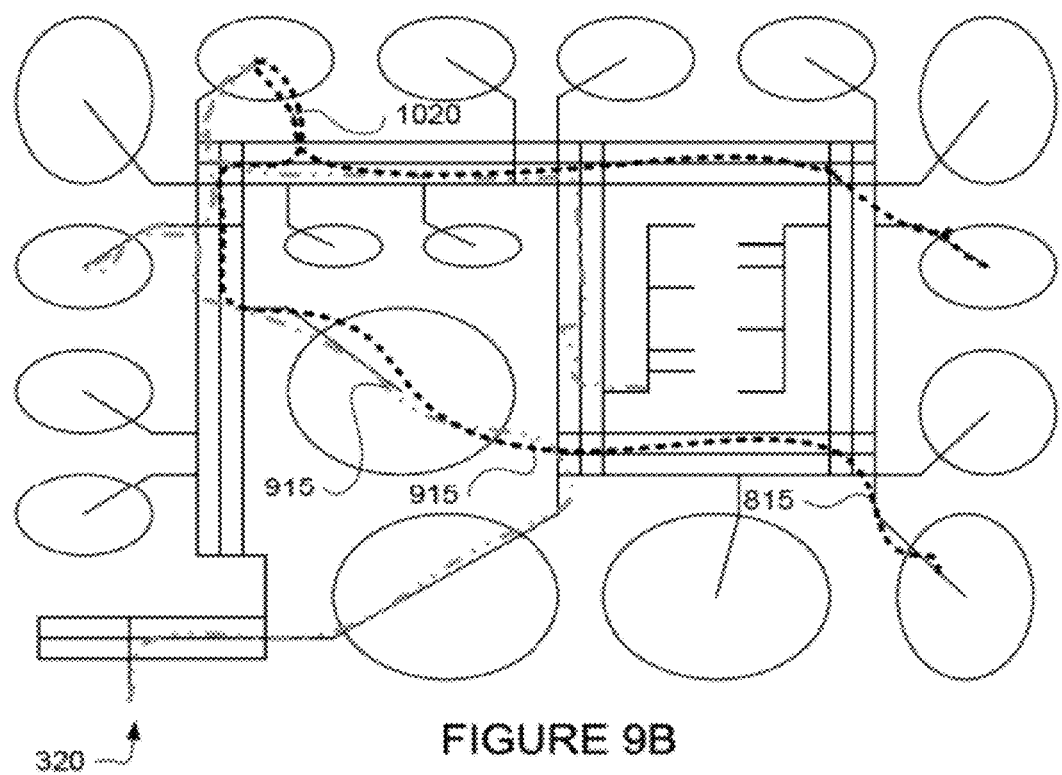

For example, as shown in FIGS. 8A and 8B, the survey data received by the server has been used to generate a path 810 and compared to map 310 while in FIG. 8B, the same survey data has been used to generate path 815 and compared to map 310. In another example, shown in FIGS. 9A and 9B, paths 810 and 815 are compared to other paths 910 and 915 (only one other path being shown in each figure with the map and rail system being displayed for reference). As shown in FIG. 9A, both paths 810 and 910 cross through wall 312, but path 810 crosses through wall 314 and path 910 does not. As shown in FIG. 9B, both paths 815 and 915 deviate significantly from rail system 320 around area 920, and path 930 deviates from rail system 320 around are 930 while path 915 does not. Accordingly, paths 910 and 915 may be associated with a consistency score which is greater than paths 810 and 815, indicating that paths 910 and 915 are higher quality localizations than paths 810 and 815.

Figure 10A:
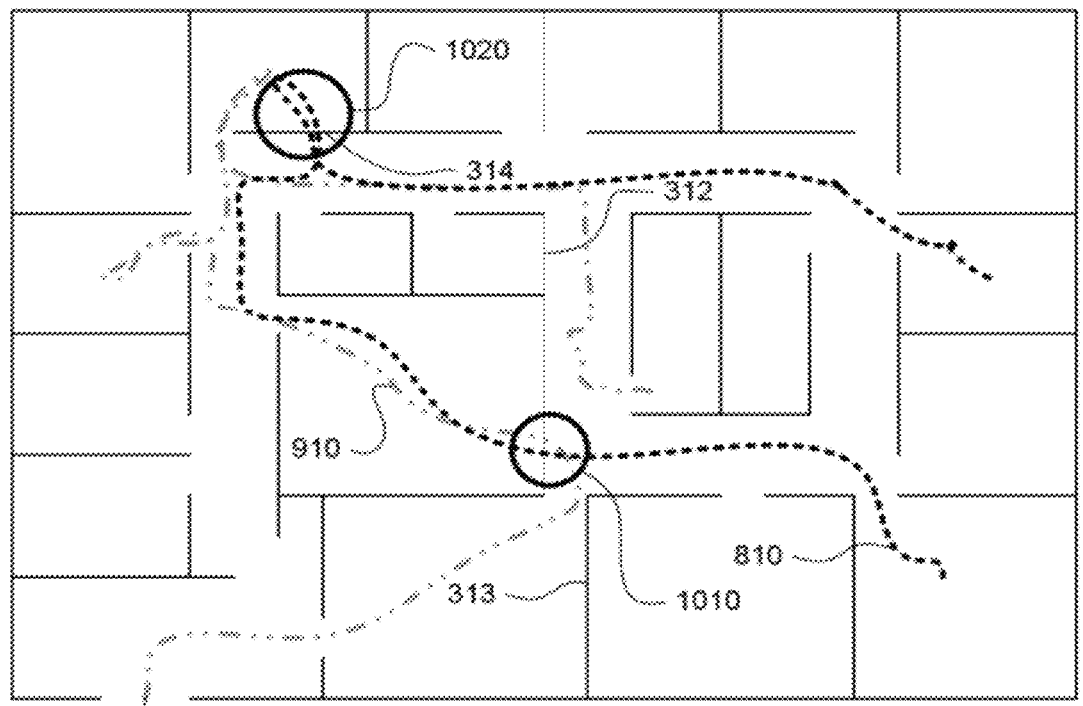
FIGS. 10A-10B are maps and data in accordance with exemplary embodiments.
Figure 10B:
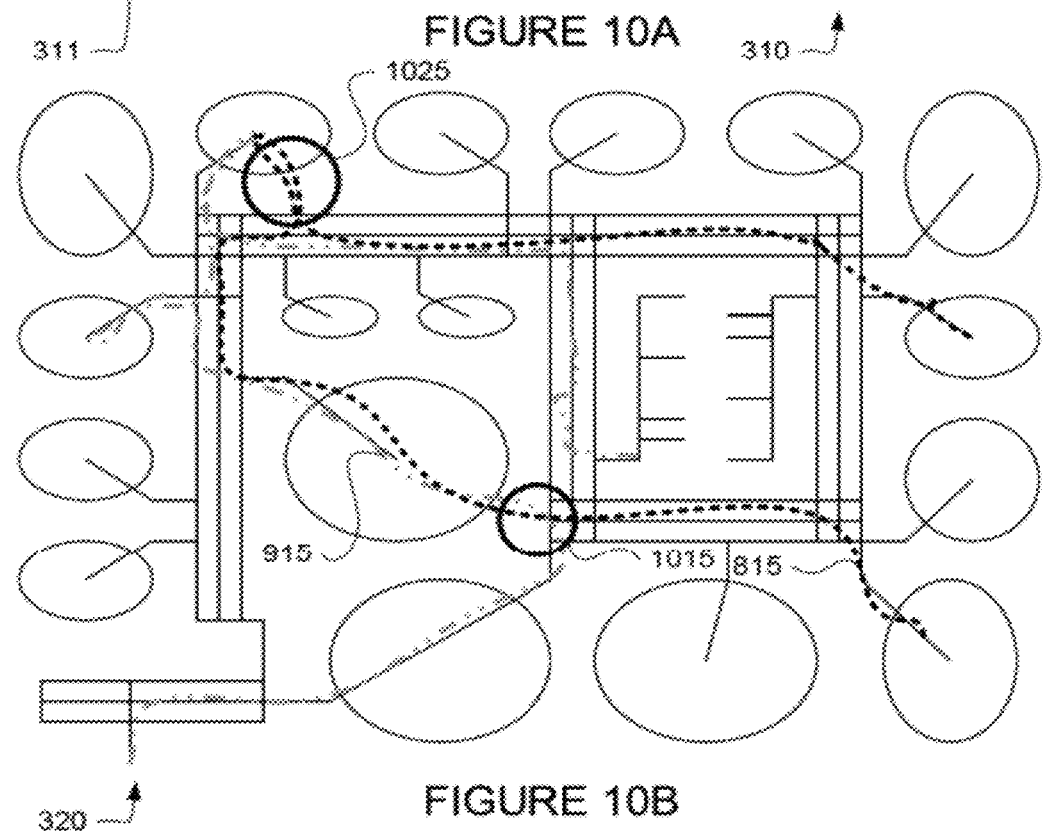

Areas of a path which demonstrate lower consistency scores or lower quality localizations, either based on other paths or with the map itself, may be flagged for further review. For example, as shown in FIG. 10A, area 1010, where paths 910 and 810 cross through wall 312, is flagged. In addition, area 1020, where path 810 crosses through wall 314, is also flagged. Similarly, as shown in FIG. 10B, area 1015, where paths 915 and 815 deviate significantly from rail system 320 is flagged. And area 1025, where path 815 deviates significantly from rail system 320, is flagged.

In response to being flagged, an area may be manually examined to check if the map is correct at that location. In another example, once flagged, the survey data in its entirety or only the flagged portion may be disregarded and not used to generate wireless network access point models for future navigation use. Returning to the partition wall example above, if the surveys of a building tended to exhibit localization problems near the partition wall, a person may be dispatched to examine if the area and the map actually differ in reality. If so, the map could be augmented accordingly.

Figure 11A:
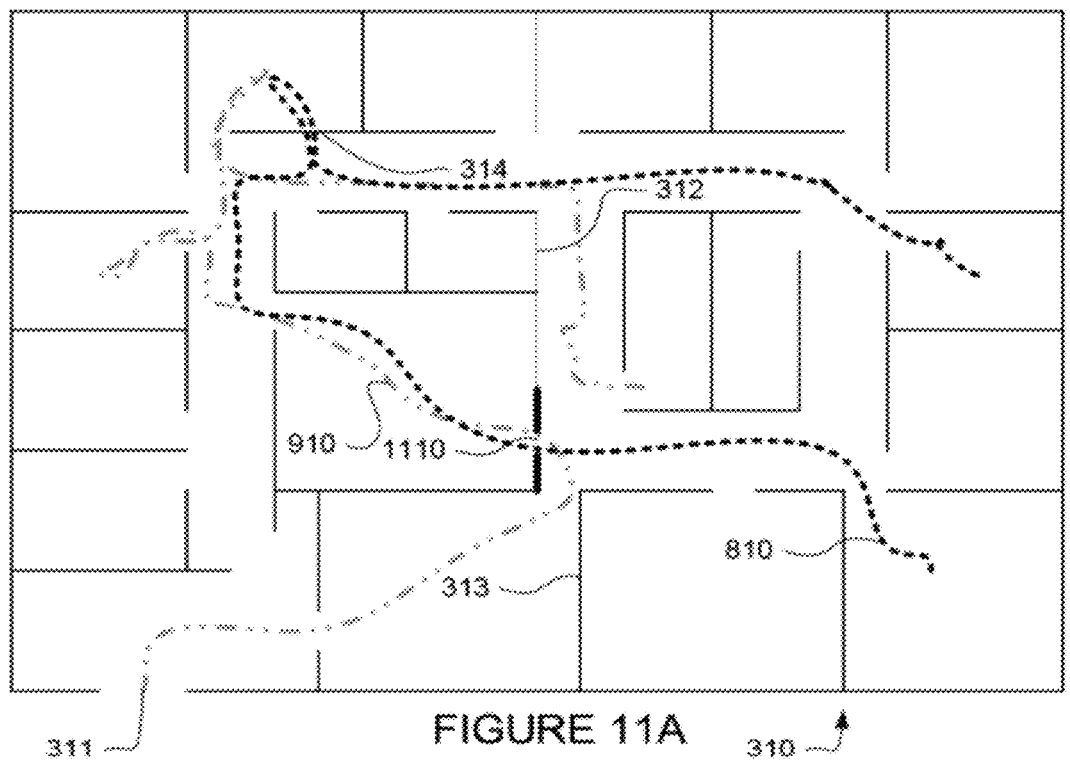
FIGS. 11A-11B are maps and data in accordance with exemplary embodiments.
Figure 11B:
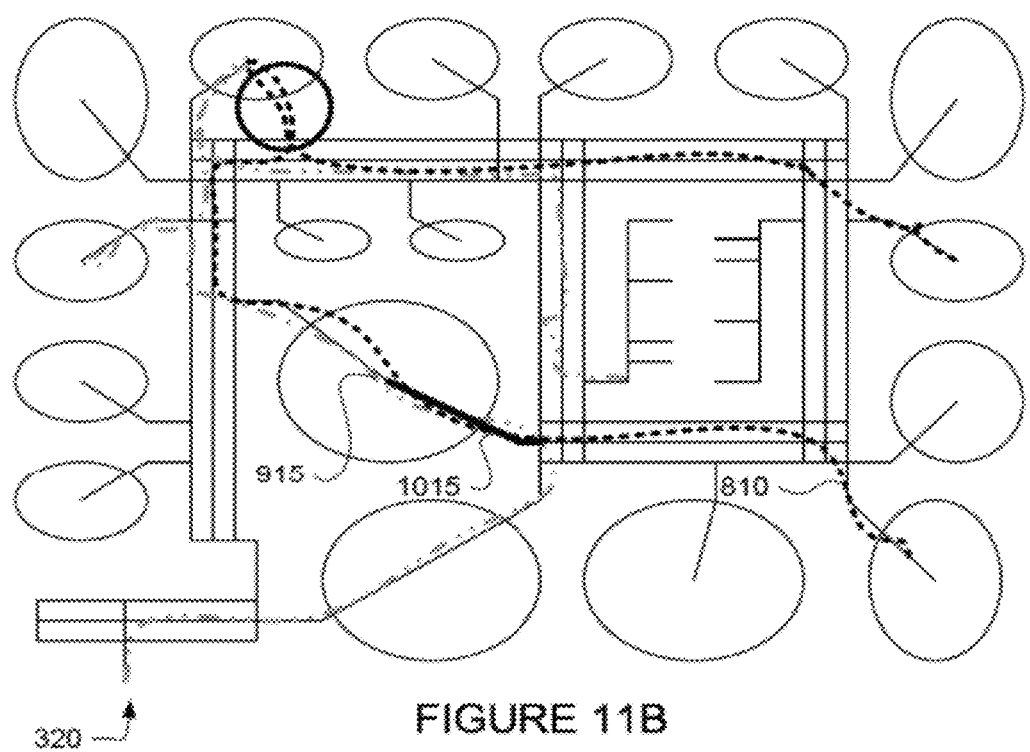

Alternatively, the map may be processed by an algorithm that adjusts the map by dropping and/or adding some walls or rails based on the survey data in order to improve the estimate of quality for the survey data for the particular area. For example, as shown in FIG. 11A, wall 312 has been adjusted to include an opening 1110 to compensate for the locations of paths 810 and 910. Similarly, as shown in FIG. 11B, rail system 320 now includes rail segment 1015 to compensate for the locations of paths 815 and 915. Again, returning to the example of the partition wall, the map may be adjusted without seeing the location in person if the proposed path of the surveyor always passed through the partition wall when in the vicinity. As a result of these changes to the maps, the consistency scores for all of these paths may increase. In some examples, the adjusted maps may then be transmitted to client devices for future use, for example, to be used for future surveys, etc.

Flow diagram 1200 of FIG. 12 depicts an exemplary embodiment of the features described above. In this example, a client device identifies a map of an indoor space (block 1202). This map may be displayed to a user. The client device then records a time-indexed log of measurements while being moved through the indoor space (block 1204). In some examples, the displayed map may show an approximate location and path of the client device in the indoor space. The client device may receive from the user information identifying the current location of the client device relative to the map (block 1206). For example, the user may select a location by touching a portion of the map, if the map is displayed on a touch-screen display. This information received from the user may be incorporated included in the time-indexed log (block 1208). For example, the time-indexed log may include wireless network access point identifiers, associated signal strengths, as well as data received from one or more orientation devices, or other devices. The time indexed-log may be transmitted to a server (block 1210). In one example, the log may be transmitted as it is being recorded, or alternatively, once the user has selected to do so.

The server then receives time-indexed logs from the same indoor space from a plurality of client devices (block 1212). The server then identifies a second map of the indoor space including a plurality of constraints (block 1214). For example, the constraints may include walls or rails as described above. For each of the received time-indexed logs, the server identifies an associated path through the indoor space (block 1216). For example, the path may be identified based on the details of the log, including, the wireless network access point identifiers and signal strengths, the data received from the orientation devices and any other devices, as well as the information identifying current locations of the client device provided by the user.

The server then selects a time-indexed log of the plurality of time-indexed logs (block 1216). Alternatively, the server may select a path of the identified associated paths for the received time-indexed logs. The server then determines a consistency score for the selected time-indexed log (or associated path) by comparison with one or more other received time-indexed logs and associated paths as well as the second map (block 1218). A portion of the path associated with the selected time-indexed log may be flagged for further review based on the consistency score (block 1220). The server then adjusts one or more constraints associated with the second map based on the flagged portion of the path (block 1222) and transmits the adjusted second map to one or more client devices (block 1224). The adjusted second map is then received by a client device (block 1226).

For the purposes of simplicity, the examples herein are directed to single story buildings. However, it will be understood that the systems and methods described herein may be utilized in conjunction with multi-story buildings. For example, a route may include using stairs, elevators, escalators, etc., in order to change floors and move through a building and collect the data as described above.

In addition, while the examples herein are presented utilizing wireless network data points, other signals may also be used. Ultrasound, Ultra-Wide Band (UWB), Bluetooth, partial or differential GPS signals, and other signals may be recorded as a particular fingerprint or included in a wireless network fingerprint. For example, UWB is a technology that may be well suited for doing indoor localization but is presently not widely deployed. As use of UWB hardware increases, for example, if this technology becomes less expensive and more widespread, it will be understood that UWB signals and signal strengths alone or in combination with wireless network signals and signal strengths. As long as there some beacon messages for a particular signal in a building, and the client device is able to receive and identify relevant data (typically an identifier and associated signal strength) from these beacons the signals may be included in the survey data.

As these and other variations and combinations of the features discussed above can be utilized without departing from the subject matter defined by the claims, the foregoing description of the embodiments should be taken by way of illustration rather than by way of limitation of the subject matter defined by the claims. It will also be understood that the provision of the examples disclosed herein (as well as clauses phrased as "such as," "including" and the like) should not be interpreted as limiting the claimed subject matter to the specific examples; rather, the examples are intended to illustrate only one of many possible embodiments. Further, the same reference numbers in different drawings may identify the same or similar elements.

The invention claimed is:

1. A method of flagging survey data, the method comprising:
receiving, from a plurality of client devices, time-indexed logs recorded while each client device was moved through an indoor space, wherein the indoor space is the same for each time-indexed log;
identifying a map of the indoor space;
for each of the received time-indexed logs, identifying an associated path through the indoor space;
selecting one of the received time-indexed logs;
determining, by a processor, a consistency score for the selected time-indexed log based on the selected time-indexed log and one or more other of the received time-indexed logs and the identified map of the indoor space; and
flagging, for further review, a portion of the path associated with the selected time-indexed log based on the consistency score.

2. The method of claim 1, wherein:
the selected time-indexed log includes data received from a user indicating a current location of the corresponding client device; and
identifying the associated path for the selected time-indexed log is based on the data received from the user.

3. The method of claim 1, wherein:
the selected time-indexed log includes data received from one or more orientation devices; and
identifying the associated path for the selected time-indexed log is based on the data received from the one or more orientation devices.

4. The method of claim 1, wherein:
the selected time-indexed log includes data identifying one or more wireless network access point locations and associated signal strengths; and
identifying the associated path for the selected time-indexed log is based on the data identifying the one or more wireless network access point locations and the associated signal strengths.

5. The method of claim 1, further comprising using the identified paths associated with the received time-indexed logs, except the flagged portion of the path associated with the selected time-indexed log, to generate a wireless network access point location and signal strength model.

6. The method of claim 1, wherein:
the identified map includes a plurality of constraints; and
the method further comprises adjusting one or more of the plurality of constraints associated with the identified map based on the flagged portion of the path associated with the selected time-indexed log to generate an adjusted map.

7. The method of claim 6, further comprising transmitting the adjusted map to a client device.

8. The method of claim 1, wherein the plurality of constraints are walls in the indoor space.

9. The method of claim 1, wherein the plurality of constraints are rails representing locations where a user may walk within an indoor space.

10. The method of claim 1, wherein determining the consistency score for the selected time-indexed log further comprises:
generating a first model of the indoor space based on the selected time-indexed logs and the identified map of the indoor space;
generating a second model of the indoor space based on the one or more other time-indexed logs and the identified map of the indoor space; and
comparing the first model to the second model.

11. A device for flagging survey data, the device comprising:
memory storing a map of the indoor space;
a processor coupled to the memory, the processor being operable to:
receive, from a plurality of client devices, time-indexed logs recorded while each client device was moved through an indoor space, wherein the indoor space is the same for each time-indexed log;
identify a map of the indoor space;
for each of the received time-indexed logs, identify an associated path through the indoor space;
select one of the received time-indexed logs;
determine a consistency score for the selected time-indexed log based on the selected time-indexed log and one or more other of the received time-indexed logs and the identified map of the indoor space; and
flag, for further review, a portion of the path associated with the selected time-indexed log based on the consistency score.

12. The device of claim 11, wherein the selected time-indexed log includes data received from a user indicating a current location of the corresponding client device, and the processor is further operable to identify the associated path for the selected time-indexed log based on the data received from the user.

13. The device of claim 11, wherein the selected time-indexed log includes data received from one or more orientation devices, and the processor is further operable to identify the associated path for the selected time-indexed log based on the data received from the one or more orientation devices.

14. The device of claim 11, wherein the selected time-indexed log includes data identifying one or more wireless network access point locations and associated signal strengths, and the processor is further operable to identify the associated path for the selected time-indexed log based on the data identifying the one or more wireless network access point locations and the associated signal strengths.

15. The device of claim 11, wherein the processor is further operable to use the identified paths associated with the received time-indexed logs, except the flagged portion of the path associated with the selected time-indexed log, to generate a wireless network access point location and signal strength model.

16. The device of claim 11, wherein the identified map includes a plurality of constraints, and the processor is further operable to adjust one or more of the plurality of constraints based on the flagged portion of the path associated with the selected time-indexed log to generate an adjusted map.

17. The device of claim 16, wherein the processor is further operable to transmit the adjusted map to a client device.

18. The device of claim 11, wherein the plurality of constraints are walls in the indoor space.

19. The device of claim 11, wherein the plurality of constraints are rails representing locations where a user may walk within an indoor space.

20. The device of claim 11, wherein the consistency score is further determined by the processor by:
- generating a first model of the indoor space based on the selected time-indexed logs and the identified map of the indoor space;
- generating a second model of the indoor space based on the one or more other time-indexed logs and the identified map of the indoor space; and
- comparing the first model to the second model.

* * * * *